(12) United States Patent
Read et al.

(10) Patent No.: US 8,632,189 B2
(45) Date of Patent: Jan. 21, 2014

(54) MULTIPLE SOURCE HIGH PERFORMANCE STEREOGRAPHIC PROJECTION SYSTEM

(75) Inventors: Steven Charles Read, Mississauga (CA); Matthew Arnold O'Dor, Toronto (CA)

(73) Assignee: IMAX Corporation, Ontario, CA (US)

( * ) Notice: Subject to any disclaimer, the term of this patent is extended or adjusted under 35 U.S.C. 154(b) by 1115 days.

(21) Appl. No.: 11/578,455

(22) PCT Filed: May 5, 2005

(86) PCT No.: PCT/US2005/015856
§ 371 (c)(1),
(2), (4) Date: Jul. 30, 2007

(87) PCT Pub. No.: WO2005/109091
PCT Pub. Date: Nov. 17, 2005

(65) Prior Publication Data
US 2008/0278689 A1 Nov. 13, 2008

Related U.S. Application Data (60) Provisional application No. 60/568,364, filed on May 5, 2004.

(51) Int. Cl.
*G03B 21/00* (2006.01)

(52) U.S. Cl.
USPC .............................................. 353/7; 359/462

(58) Field of Classification Search
USPC ................... 359/462, 465; 353/7–9
See application file for complete search history.

(56) References Cited

U.S. PATENT DOCUMENTS

| 3,914,645 | A | | 10/1975 | LiDonnici |
| 3,923,389 | A | | 12/1975 | Rogers et al. |
| 4,151,549 | A | * | 4/1979 | Bautze ............................ 348/44 |
| 4,372,656 | A | | 2/1983 | Marks et al. |
| 4,390,239 | A | | 6/1983 | Huber |
| 4,916,485 | A | * | 4/1990 | Loth et al. ..................... 352/198 |
| 5,504,544 | A | | 4/1996 | Dreyer et al. |

(Continued)

FOREIGN PATENT DOCUMENTS

| EP | 1 315 018 A | 5/2003 |
| GB | 732 730 A | 6/1955 |

(Continued)

OTHER PUBLICATIONS

EP Application No. 05742716.3, Office Action mailed on Apr. 20, 2009, 4 Pages.

(Continued)

*Primary Examiner* — Francis M Legasse, Jr.
*Assistant Examiner* — Jerry Brooks
(74) *Attorney, Agent, or Firm* — Kilpatrick Townsend & Stockton LLP (57) ABSTRACT

Multiple source high performance stereographic projection systems are described. One projection system described comprises a first projection channel, a first light source capable of providing light for the first projection channel, and a second light source capable of providing light for the first projection channel, wherein when the projection system is in a first presentation mode the first and second light sources are on, and wherein when the projection system is in a second presentation mode the first light source is on and the second light source is at a reduced power.

43 Claims, 7 Drawing Sheets

(56) References Cited

U.S. PATENT DOCUMENTS

| | | | |
|---|---|---|---|
| 5,808,759 | A | 9/1998 | Okamori et al. |
| 5,818,575 | A | 10/1998 | Creighton |
| 5,980,046 | A | 11/1999 | Park |
| 5,997,150 | A | 12/1999 | Anderson |
| 6,005,722 | A | 12/1999 | Butterworth et al. |
| 6,239,556 | B1 | 5/2001 | Derra et al. |
| 6,341,876 | B1 | 1/2002 | Moss et al. |
| 6,479,946 | B2 | 11/2002 | Kai et al. |
| 6,525,491 | B2 | 2/2003 | Huber et al. |
| 6,545,814 | B2 * | 4/2003 | Bartlett et al. ............... 359/636 |
| 6,606,173 | B2 | 8/2003 | Kappel et al. |
| 6,843,591 | B1 * | 1/2005 | Peng et al. .................. 362/560 |
| 7,102,833 | B2 * | 9/2006 | Cole et al. ................... 359/738 |
| 2002/0030795 | A1 * | 3/2002 | Yamamoto .................... 353/94 |
| 2002/0145708 | A1 | 10/2002 | Childers et al. |
| 2003/0112507 | A1 * | 6/2003 | Divelbiss et al. ............ 359/464 |
| 2003/0128427 | A1 | 7/2003 | Kalmanash et al. |
| 2003/0142296 | A1 | 7/2003 | Schmidt et al. |
| 2005/0225630 | A1 * | 10/2005 | Childers et al. ................ 348/51 |

FOREIGN PATENT DOCUMENTS

| | | |
|---|---|---|
| JP | 56149180 | 11/1981 |
| JP | 63124021 | 5/1988 |
| JP | 05151932 | 6/1993 |
| JP | 00066135 | 3/2000 |
| JP | 2000-194067 A | 7/2000 |
| JP | 200113588 | 1/2001 |
| JP | 01035447 | 2/2001 |
| JP | 2001296604 | 10/2001 |
| JP | 2005-515487 A | 5/2005 |

OTHER PUBLICATIONS

EP Application No. 09177268.1, Office Action mailed on Aug. 20, 2010, 1 Page.

Australian Application No. 2005241544, First Examination Report mailed on Sep. 21, 2009, 2 Pages.

Chinese Application No. 200580014473.6, Office Action mailed on Jan. 9, 2009, 4 Pages of Office Action and 3 Pages of English Translation.

Chinese Application No. 200580014473.6, Office Action mailed on Jan. 8, 2010, 4 Pages.

Japanese Application No. 2007-511637, Office Action mailed on Nov. 9, 2010.

International Application No. PCT/US2005/015856, International Preliminary Report on Patentability and Written Opinion mailed on Nov. 16, 2006, 12 Pages.

International Application No. PCT/US2005/015856, International Search Report mailed on Dec. 23, 2005, 5 Pages.

European Search Report dated Dec. 22, 2009 in related Application No. EP09177268.1.

C. I. DuMont, et al., SMPTE Journal, 'Design Improvements for Motion Picture Film Projectors,' vol. 110, No. 11, pp. 788-790 (Nov. 2001).

'Projector Christie LW40 User's Manual,' Oct. 31, 2003, Japan XP002342950, pp. 34, 38.

Patent Abstracts of Japan, vol. 016, No. 162 (E-1192), Apr. 20, 1992 and JP 011492 A, Mitsubishi Electric Corp., Jan. 16, 1992.

Felix Schuda, 'Cermax Lamp Engineering Guide,' 1998, ILC Technology, Inc., USA, XP002342951, pp. 31-32.

Patent Abstracts of Japan, vol. 018, No. 627 (P-1834), Nov. 29, 1994 and JP 06 242397 (Chinon Ind. Inc.), Sep. 2, 1994.

Pinho, 'Optics of Digital Cinema.' Proceedings of the SPIE—The International Society for Optical Engineering, vol. 5002, 2003, pp. 123-131, XP002356396, paragraph under Fig. 6, p. 127.

Australian Patent Application No. 2005241544, Notice of Allowance, mailed Apr. 19, 2010 (3 pages).

Australian Patent Application No. 2005241544, Response, filed Mar. 30, 2010 (9 pages).

Australian Patent Application No. 2010203286, First Examination Report, mailed Jun. 15, 2011 (2 pages).

Chinese Patent Application No. CN201010173485.6, First Office Action, mailed Apr. 1, 2011 (9 pages).

European Patent Application No. 05742716.3, Response, filed Jul. 31, 2009 (19 pages).

European Patent Application No. 05742716.3, Communication Under Rule 71(3)—Intent to Grant Patent, mailed Sep. 11, 2009 (39 Pages).

European Patent Application No. 09177268.1, Response, filed Feb. 24, 2011 (24 pages).

Indian Patent Application No. 3080/KOLNP/2006, First Examination Report, dated Apr. 25, 2011 (16 pages).

Indian Patent Application No. 3080/KOLNP/2006, Response, filed Sep. 19, 2011 (3 pages).

Japanese Patent Application No. 2007-511637, Office Action, dated Mar. 1, 2011 (1 page).

Australian Patent Application No. 2010203286, Notice of Acceptance mailed Jan. 3, 2012 (3 pages).

Chinese Patent Application No. 200580014473.6, Office Action mailed Oct. 18, 2011 (24 pages).

First Office Action for Canadian Patent Application No. CA 2,567,040, mailed Mar. 7, 2012 (3 pages).

Second Office Action for Chinese Patent Application No. CN 201010173485.6, mailed Feb. 27, 2012 (5 pages).

Response for Canadian Patent Application No. CA 2,567,040, filed Aug. 23, 2012 (7 pages).

* cited by examiner

MULTIPLE SOURCE HIGH PERFORMANCE STEREOGRAPHIC PROJECTION SYSTEM

CROSS-REFERENCE TO RELATED APPLICATION

This application is the U.S. national phase of International Application No. PCT/US2005/015856 filed on May 5, 2005 and published in English on Nov. 17, 2005 as International Publication No. WO 2005/109091 A2, which application claims the benefit of U.S. Provisional Application Serial No. 60/568,364 filed on May 5, 2004, the contents of which are incorporated by reference herein.

FIELD OF THE INVENTION

The present invention relates generally to projection systems and, more particularly, to multiple source high performance stereographic projection systems.

BACKGROUND

Large format 2D and 3D cinematic projection has been providing audiences with an immersive theatre experience since the 1970's, and the projection technology is well established. The large format (70 mm) commercial exhibitor benefits from the capability to present both two-dimensional ("2D") and three-dimensional ("3D") cinematic presentations from the same projection system. This increases his/her return on investment. The operator would clearly benefit if the projection system functioned efficiently in both the 2D and 3D operating modes.

There can be technological differences between standard 355 mm and large format 70 mm projection equipment. The large film frame dimension offered by the 70 mm/15 perf format drives all these differences. The size of the large format film frame is about ten times that of the standard 35 mm film frame. Because of this, almost everything about the large format projection systems is generally larger, faster, or more powerful than their standard 35 mm cousins. A defining feature of the large format technology is the powerful illumination system required to illuminate the horizontally traveling 70 mm wide film.

The illumination system in a projection system represents a significant factor in the cost of operating the system. The arc lamps have limited lifetimes (1000 hours), and so must be continually monitored and periodically replaced when they no longer meet performance requirements. Lamp replacement is a potentially hazardous task that requires a careful alignment procedure conducted by a trained individual.

The high power lamps consume significant amounts of electrical power and generate tremendous amounts of heat. This heat is generally vented from the projection room and out of the building, and air conditioning must be adequate to cool the small projection hall. This generates increased utility costs for the exhibitor. Shutting down lamps between shows to conserve utility costs is often not a viable option. Standard high power arc lamps generally cannot be extinguished and restarted without significant penalty to the arc lamps lifetime (1.5 to 2.5 hours per lamp start).

For 3D projection, the demands on the illumination system may be more than doubled. In some cases two channels, one for each eye, are projected simultaneously from two physically separate but synchronized projectors, each with its own film reel. Each channel may be polarized with a different polarization, and the two polarizations are orthogonal to each other. In other cases, a single channel is used to project each eye in sequence. With a single channel 3D projector, the projector may have a polarizer that is capable of changing for each eye or active LCD glasses are used that are synchronized to the images being projected. The polarization of the illumination results in a light loss of over 50% as compared to the non-polarized 2D projection, while the screen brightness requirements remain unchanged. Using active glasses also results in a light loss compared to 2D projection. This results in a significant difference in screen luminance between 3D and 2D presentations. Standard arc lamps can only be operated near their full output power (to conserve lamp life), so modulating the lamp power to compensate for the varying 2D and 3D power requirements has not been a viable option with existing systems.

For long duration 2D projection, there are additional light inefficiencies. Limits to the physical size of reel units that hold the film demand that these long duration presentations be split between two distinct reel units. The first part of the presentation is played back through one channel of the system with a transition to the second channel for the final part of the presentation. The penalty associated with lamp ignition normally leads to the requirement that both upper and lower channel lamps remain on during the whole presentation.

The large film format may demand not only a significantly more powerful illumination system, but also one that delivers the required uniformity and stability over the much larger film frame of the 70 mm format. The performance requirements of the large format illumination system exceed that of the standard 35 mm systems.

Some conventional projection systems have utilized multiple lamps. For example, U.S. Pat. No. 4,916,485 discloses a projection system with side-by-side lamp houses that can be used for both 3D and 2D projection of large format cinema. While this projector system uses two lamps, there is only one lamp for each channel, which offers no advantage over standard stereographic projection systems. Particularly, there is no way to balance the light levels between 2D and 3D operating modes without incurring a significant loss in efficiency.

U.S. Pat. No. 3,914,645 discloses a multiple lamp unit for use with a photographic projector. The '645 patent provides for a single lamp projector with multiple "back up" lamps mounted on a turntable that can be rotated so as to move successive lamps into working position to automatically replace lamps when they fail. In U.S. Patent Application No. 2003/0128427 a system for employing dual projector lamps is disclosed. It uses two sources and polarization optics to select between one source and the other, using one source at a time. U.S. Pat. No. 6,545,814 discloses a method for combining multiple arc lamp sources for a electronic projector using prismatic structures integrated onto an integrating rod.

U.S. Patent Application No. 2002/0145708 discloses a dual lamp projector illumination system with a broad spectrum source and a narrow spectrum source. The narrow spectrum light source is an LED and is used to complement the spectrum of the broad spectrum source, which has a spectral power deficiency. U.S. Pat. No. 5,997,150 discloses a multiple emitter illumination engine with a holographic diffuser with particular application to xerographic printers and for illuminating spatial light modulators with high intensity light. In U.S. Pat. No. 6,341,876, a method for combining two lamps into a light pipe is disclosed. The '876 patent discloses the use of a parabolic reflector for the arc lamps. The '876 patent also discloses a method of combining the output of two lamp sources into a light pipe with two right angle prisms.

U.S. Pat. No. 5,504,544 discloses a method for combining multiple lamps using a series of Fresnel collecting and focusing elements. U.S. Pat. No. 4,372,656 discloses a single lamp projector that can be used for 3D as well as 2D projection through the introduction of a polarization device.

These prior projection systems do not disclose the balancing of light levels between the 3D and 2D operating modes of a projection system nor do they address the optimization of efficiency and reduced operating costs for 2D and 3D operation of these projection systems.

Temporal stability of the light output in the frequency range over which the human visual system is sensitive is an important projection system attribute. Flicker and shimmer are the product of the frequency dependent sensitivity of the human eye times the stability of the light output. Flicker is the global fluctuations of light levels at the screen. Flicker is present when the total luminous flux output from the projector varies with time. Shimmer is localized spatial fluctuations at the screen. When shimmer is observed, the illuminance changes locally on the screen despite a constant total luminous flux output from the projector. Thus a decrease of illuminance in one area on the screen is compensated for by an increase in illuminance elsewhere on the screen.

Arc lamp induced temporal instabilities present a particular challenge to the illumination system of an arc lamp based projection system. These instabilities can manifest themselves as flicker and shimmer of the projected image. Human perception is particularly sensitive to these fluctuations, and people are able to discern temporal fluctuations as small as one part in two hundred. This places a far more stringent requirement on the illumination system than does the requirement for static illumination uniformity across the screen. Shimmer and flicker are kept below the human detection threshold in order not to detract from the presentation.

Arc lamp instabilities can be caused by modulation of the arc's position and shape within the lamp envelope of the lamp. These modulations induce spatial and angular variations of the illumination signal. Turbulence within the envelope induces other localized angular deviations as the illumination signal propagates through the turbulent regions. These temporal angular modulations of the illumination at the lamp are transformed to angular and spatial fluctuations of the irradiance patterns in subsequent positions of the optical system, which in turn are perceived as shimmer or flicker by the audience.

The level of temporal instability of an arc lamp becomes more acute as the power of the lamp increases and its size decreases. Arc lamp stability is also known to degrade with lamp age. To meet the illumination requirements of large screens, high power lamps are employed. To satisfy- the demands of a compact projection system, there is a drive to make the lamps as small as possible. The higher levels of convection within the envelope of a compact high power lamp lead to a greater amount of temporal instability.

Arc lamp output fluctuation is a recognized problem, and there are several examples of conventional solutions relating to its reduction. These solutions generally involve modifying or manipulating the electrical power characteristics driving the lamp, for example, U.S. Pat. Nos. 6,525,491, 6,479,946, and 6,239,556, or modifying the ingredients within the lamp envelope, for example, Japanese Patent Application No. 02-01-01 01035447, and Japanese Patent Application No. 00-77-76 05151932.

Optical means to reduce shimmer is also used by some conventional solutions. Japanese Patent Application No. 03-01-00 00066135 discloses that a number of discrete "half mirrors" to flatten the light fluctuations caused by the shimmer. In Japanese Patent Application No. 00-95-76 56149180 a photochromic device is applied with a feedback circuit to control the transmission of the photochromic device.

U.S. Pat. No. 6,341,876 discloses a method for optically eliminating the effects of shimmer from the projected images. The '876 patent discloses a condensing lens at the input of a light pipe with the express intent of eliminating the image of the turbulent region within the arc lamp at the output of the light pipe.

In the paper entitled "Design Improvements for Motion Picture Film Projectors," C. L. DuMont et al., SMPTE Journal, vol. 110, no. 11, 2001, the authors present results of their work in applying fly's eye integrators to 35 mm cinematic projectors. The paper discusses the advantages that the fly's eye integrator provides in reducing the lamp-induced shimmer in the projected image. They also discuss the use of a Cermax sealed beam lamp in the projection system.

U.S. Patent Application No. 2003/0142296 discloses a means for monitoring light levels by using a detector plus integrating box plus mirror assembly located behind a primary mirror that reflects a large portion of the visible light towards a light imaging device. This application discloses that it is necessary to sample and integrate 10% to 50% of the light transmitted by the primary mirror in order to achieve a sufficient signal to noise ratio.

U.S. Pat. No. 5,818,575 discloses a method to detect instability in an arc lamp's spatial distribution, particularly for use in lithography projection optics. At least two detectors are placed laterally across the illumination field at the wafer plane or conjugate to the wafer plane. The ratio of the output from the two detectors indicates the stability of the arc lamp.

These references do not disclose a light efficient and cost effective means of suppressing lamp-induced shimmer and flicker in the projected image. As described above, these modulations may be at a higher magnitude than usual due to the use of compact high wattage lamps. While fly's eye and light pipe homogenizers reduce these fluctuations, limitations in the fabrication methods as well as efficiency considerations make sufficient homogenization impractical and inefficient.

Additionally, the large physical size of the typical 70 mm format projection system can make them incompatible with standard 35 mm projection facilities. The vast majority of theatre venues are designed for the standard 35 mm format projection systems. Theatre operators considering the installation of modern large format projection equipment must therefore factor in renovations to convert existing 35 mm projection halls. This may increase the installation costs, disrupt theatre operations, and prolong the installation process. These factors may all contribute to increased cost of ownership to the theatre operator.

SUMMARY OF INVENTION

Embodiments of the present invention comprise multiple source high performance stereographic projection systems. One embodiment of a projection system of the present invention comprises a first projection channel, a first light source capable of providing light for the first projection channel, and a second light source capable of providing light for the first projection channel, wherein when the projection system is in a second presentation mode the first and second light sources are on, and wherein when the projection system is in a first presentation mode the first light source is on and the second light source is at a reduced power. In one embodiment, the first presentation mode is a two-dimensional presentation mode and the second presentation mode is a three-dimensional presentation mode. In one embodiment, when the projection system is in two-dimensional presentation mode the second light source is off. More than two light sources may be used per projection channel.

The projection system may also have a second projection channel, a third light source capable of providing light for the second projection channel, and a fourth light source capable of providing light for the second projection channel, wherein when the projection system is in the second presentation mode the third and fourth light sources are on, and wherein when the projection system is in the first presentation mode the third and fourth light sources are off.

In another embodiment, a system of the present invention comprises a projection channel, a first light source capable of providing light for the projection channel, a second light source capable of providing light for the projection channel, a combining device for combining light produced by the first light source and the second light source into combined light, and a fly's eye integrator for integrating the combined light.

These illustrative embodiments are mentioned not to limit or define the invention, but to provide one example to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF DRAWINGS

These and other features, aspects, and advantages of the present invention are better understood when the following Detailed Description is read with reference to the accompanying drawings, wherein.

DETAILED DESCRIPTION

Introduction

Embodiments of the present invention comprise multiple source high performance stereographic projection systems. There are multiple embodiments of the present invention. By way of introduction and example, one illustrative embodiment of the present invention provides a projection system with a compact illumination system that includes multiple light sources, such as arc lamps, for each channel, and discloses light source operating strategies to optimize system efficiency, performance, and operating costs of a projection system with dual 3D/2D presentation modes, and maintaining consistent light levels for both operating modes. For example, in one embodiment, a stereoscopic projection system has two projection channels that utilize two light sources per channel. In this embodiment, all four light sources may be used for 3D presentation mode when both channels are used. In 2D presentation mode, when a single channel is used, one of the light sources associated with the channel is not used or the output of both light sources is reduced. The projection system of the present invention may avoid the high cost of acquiring, installing and operating a high-resolution stereographic projection system and is also capable of efficiently projecting high-resolution 2D presentations. The projection system of the present invention is applicable to large and 35 mm format film and electronic projection systems.

In one embodiment, the projection system includes polarization components that may be automatically inserted and retracted as required for stereographic projection. This system works in concert with the light source usage protocol to optimize system efficiency, lower operating costs, simplify operation of the system, and improve the reliability and quality of the presentations.

In one embodiment, the projection system provides for the elimination of shimmer in the image caused by turbulence within the arc lamp's envelope. This is accomplished through the introduction of a diffusing element that works in concert with "fly's eye" or light pipe integrating optics. While the fly's eye or light pipe integrating optics reduce these fluctuations, limitations in the fabrication methods make sufficient integration impractical and inefficient. As described below, a diffusing element is added into the system that reduces the residual shimmer to a level significantly below that detectable by the human visual system. In addition to reducing shimmer, the diffuser also serves to provide more uniform illumination across the image gate.

Other aspects of this invention are related to reducing cost and size of the system. In one embodiment of the projection system, the functions of a cold mirror and mechanical dowser are combined in the system, thereby reducing part count, system size, and manufacturing costs. In one embodiment, the projection system uses a compact and light efficient method to combine the outputs of multiple light sources per channel.

The above introduction is given to introduce the reader to the general subject matter of the application. By no means is the invention limited to such subject matter. Illustrative embodiments are described below.

Illustrative System Description

Figure 1:
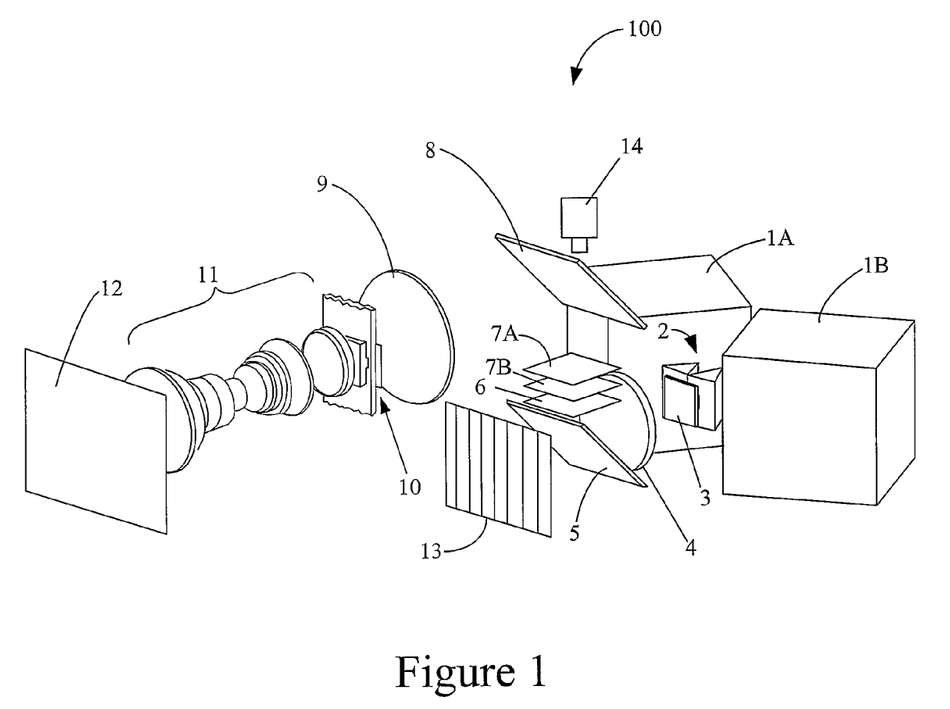
FIG. 1 shows a schematic of the an illustrative embodiment of an optical system of a projection system.

FIG. 1 shows a schematic of an illustrative embodiment of an optical system of a projection system. The embodiment of FIG. 1 illustrates a system where images are created on the screen by film transported into the image gate. The present invention applies equally to electronic projectors utilizing other spatial light modulation techniques at the image gate, including, but not limited to, micro-electro-mechanical systems (MEMS), reflective liquid crystal panels (LCOS) and transmissive liquid crystal panels or CRTs. FIG. 1 illustrates a single channel. In some embodiments, the projection system would have two optical systems 100 within the same housing in order to project 3D content.

The illumination train consists of the two light sources, such as arc lamp assemblies 1A, 1B, each with integrated elliptical reflectors (not shown). The lamps 1A, 1B direct their illumination onto the entrance face of the combining prisms 2. In one embodiment, these prisms 2 redirect the lamp illumination by means of total internal reflection. The light exiting the two combining prisms 2 then enters the integration optics, which includes the holographic diffuser 3, collimating optics 4, the lens array pair 7A, 7B, and relay optics 9. The lens array pair 7A, 7B act as a fly's eye integrator. The entrance pupil of the illumination system is located at lens array 7B. The relay optics 9 serve to magnify the images of the lens array to fully illuminate the image gate 10 and to match the light to the pupil of the projection lens 11. This light efficient subsystem projects a uniform light distribution free of perceptible lamp flicker and shimmer onto the image gate. The desired image is impressed upon this uniform patch of light at the image gate 10 by means of film (not shown) transported into the image gate 10. The projection lens 11 then projects the image that is present at the image gate 10 through a removable polarizer 12 onto the screen (not shown). An ultraviolet filter 6 positioned upstream of the lens array 7A rejects the damaging short wavelength radiation and prevents it from propagating through the fly's eye integrator (7A, 7B) and to the image gate 10.

The hybrid cold mirror/dowser 5 is positioned prior to the lens array pair 7A, 7B. The cold mirror/dowser 5 has two functions: to filter out the infrared component of the illumination; and to act as a projector dowser. When flipped or rotated out of the optical path, the illumination is transmitted to a beam dump 13 that effectively prevents any illumination from exiting the projector.

A second cold mirror 8 reflects the illumination exiting from the lens array pair 7A, 7B and directs it along the optical axis defined by the projection lens 11. It also acts as a secondary cold mirror, filtering out any residual IR radiation left in the illumination. A detector 14 may be placed behind this mirror to monitor light levels and temporal instabilities, such as flicker and shimmer.

In one embodiment, the illumination system is designed to be compact enough to allow two separate channels (such as separate left and right eye channels) to be integrated into a single projection system unit as opposed to a separate projector for each channel. This can simplify the control electronics for the projection system, reduce the floor space needed in the projection booth or hallway, and reduce installation time.

Lamps

The two sealed beam Xenon arc lamps (1A and 1B) are aligned with elliptical reflectors (not shown) to produce a focused image of the arc. In one embodiment, the Cermax brand of sealed beam arc lamps are used as the light sources. These lamps, manufactured and sold by Perkin Elmer, are high intensity discharge lamps (arc lamps) with several unique characteristics that are exploited to great advantage in the illumination architecture presented here. Although Cermax lamps are limited to lower powers than bubble lamps, multiple Cermax lamps coupled to an efficient illumination system can achieve equivalent output powers. A number of significant advantages over the single high power bubble lamp design are also introduced.

Cermax lamps are significantly more compact than bubble lamps, and even a pair of Cermax lamps can have a substantial size advantage over the single bubble lamp design. This permits the design of a more compact 3D projector system. The importance of a compact system is driven by the need to fit the projector into existing 35 mm hallways, a capability that can substantially reduce the cost of installation. Also in cases where two channels are used for 3D presentation mode, a smaller projector allows the projection points of left and right images to be closer, which can be a performance advantage. For example, this can allow better coincidence of images across the screen and reduce differences in light levels between left and right eye images caused by distinct angles of incidence on a high gain screen both of which lead to less eye fatigue when viewing a 3D presentation.

Additionally, compact lamps permit the integration of left and right channels into a single projector. While mechanically distinct left and right optical trains could lead to a small separation between projection points, the overall projection system would become larger and more expensive to manufacture due to higher inventory costs for distinct elements.

Cermax lamps are fabricated with an integrated reflector pre-aligned with the arc gap defined by the cathode and anode at the time of manufacture. External datum features facilitate accurate alignment between the arc lamp and an optical system. The etendue of the light emitted by the Cermax lamp is smaller than the portion of the etendue of the film gate seen by each lamp. This characteristic is exploited in a number of ways in embodiments of the present invention. When coupled with an appropriately designed illumination system such as the one described below, the accuracy to which the lamp needs to be positioned to achieve consistent uniform screen illuminance is easily met by inexpensive machining tolerances. This may eliminate the need for a skilled projectionist or technician to perform lamp alignment, a task that requires training, skill and patience. This advantage can reduce the cost of operating the projection system, and ensure a more consistent and reliable illumination quality.

The Cermax lamp can be operated over a broad range of power levels, unlike standard arc lamps, which are generally used at or near full power in order to achieve stable operation and maximum lifetime. Furthermore, operating a Cermax lamp at lower power significantly extends the life of the lamp. Unlike standard bubble lamps, Cermax lamps can be extinguished and restarted with little penalty to lamp life. These capabilities can be exploited to significantly improve system efficiency through the application of lamp operating strategies for combined 3D/2D illumination systems.

For 3D presentation mode utilizing a two-channel system, each channel may be polarized with a linear polarizer. Resulting polarization losses in each channel are typically greater than 50%. The polarizer is not required for 2D presentation mode, and therefore there is no polarization loss incurred for 2D presentation mode if the polarizer is removed. Similarly, if active glasses are used with a 3D projection system illumination losses also occur. With the projection system of the present invention, a lamp utilization strategy may be employed to optimize operating costs for the projection system. For 3D presentation mode, two lamps are operated for each channel in a two-channel system (or for a single channel in a single channel system) to provide high illumination power to overcome polarization or other illumination losses, such as losses incurred when using time sequential 3D. The two lamps may be operated at levels significantly less than their full power to extend their life. Sensors, such as detector 14 shown in FIG. 1, connected to a feedback or control system can monitor each lamp's output. Increasing the drive current to the lamp can compensate for decreasing output levels as the lamp ages.

Electronic projectors that output polarized light (e.g. LCOS and LC projectors) can be configured to present 3D images with only a small brightness loss compared to 2D presentations. In these systems there is not a need to overcome polarization losses. However, light levels may need to be reduced due to ghosting in 3D presentations. Ghosting is a double image that the viewer sees when light enters the incorrect eye. In 3D presentations there is a tradeoff between perceived ghosting and brightness. Specifically, the perceived ghosting is reduced as the brightness is decreased. In this situation it may be desirable to operate the lamps in a fashion that is opposite to what is described above. Here more light output is required for 2D presentations leading to the requirement that both lamps are turned on. Less light output is required for 3D presentations allowing for either single lamp operation or two lamp operation at reduced power levels.

For 2D presentation mode in a two-channel system, only one of the projection channels may need to be operated. If the first channel is elected, its polarizer is retracted and one of the lamps in the first channel can be operated at a reduced power, such as zero power so that it is extinguished. Both lamps in the second channel are extinguished as well. This leaves one of four lamps in the system operating, reducing electrical power requirements for illumination to 25% of that required for 3D presentation mode. Further efficiencies are gained through reduced cooling requirements, reduced load on projection room ventilation and air conditioning, and increased lamp life. The lamp used can be alternated for each 2D projection event in order to maintain similar lamp lifetimes across the two lamps. In case of failure of one of the lamps, the second lamp provides an immediate backup, thereby providing redundancy for the 2D presentation mode of operation. Yet another strategy for 2D presentation mode is to operate both lamps associated with a projection channel simultaneously at significantly reduced power (but greater than zero), which can extend the lifetime of each lamp. In one embodiment, the projection system may allow for the change of presentation mode during a single presentation, such as changing between a two-dimension presentation mode and a three-dimensional presentation mode. For example, a 3D presentation preview trailer may be shown before a 2D presentation and a 3D sequence may be shown within a 2D presentation.

While Cermax lamps are the preferred light source for this system, it will be clear to one of skill in the art that other light sources may be used in the system. Integrated modules with a bubble lamp pre-aligned to a reflector are readily available from a number of different suppliers. There are other suppliers of sealed beam arc lamps as well. Other lamps with small etendue, such as high-pressure mercury lamps and metal halide, may also be used in the present invention to great advantage.

Lamps with parabolic reflectors may also be used provided their output is focused into the combining prisms through the use of a lens. While the embodiments described above utilize two lamps per channel, alternative embodiments may combine more than two lamps per channel.

Combining Prisms

In one embodiment, each combining prism 2, shown in FIG. 1, uses total internal reflection (TIR) to reflect the lamp illumination into a common optical path. The TIR mechanism precludes the use of damage-prone reflective coatings, and provides 100% reflectivity from the TIR surface of the prism. Prism material is typically but not limited to quartz, which has a high tolerance to heat absorbed from the radiation and from components in contact with the prisms. Anti-reflection coatings can be applied to the input and exit faces of the prisms. It will be apparent to those skilled in the art that while prisms are used in one embodiment for lamp combining, other methods of combination including polished aluminum mirrors and dichroic mirrors could be used. It will also be apparent to those skilled in the art that the prisms are used as needed to combine the output of multiple lamps. For example, one method to combine three lamps would be to separate the two prisms 2 allowing the light output from a third lamp to pass without deviation between the two prisms.

Figure 2:
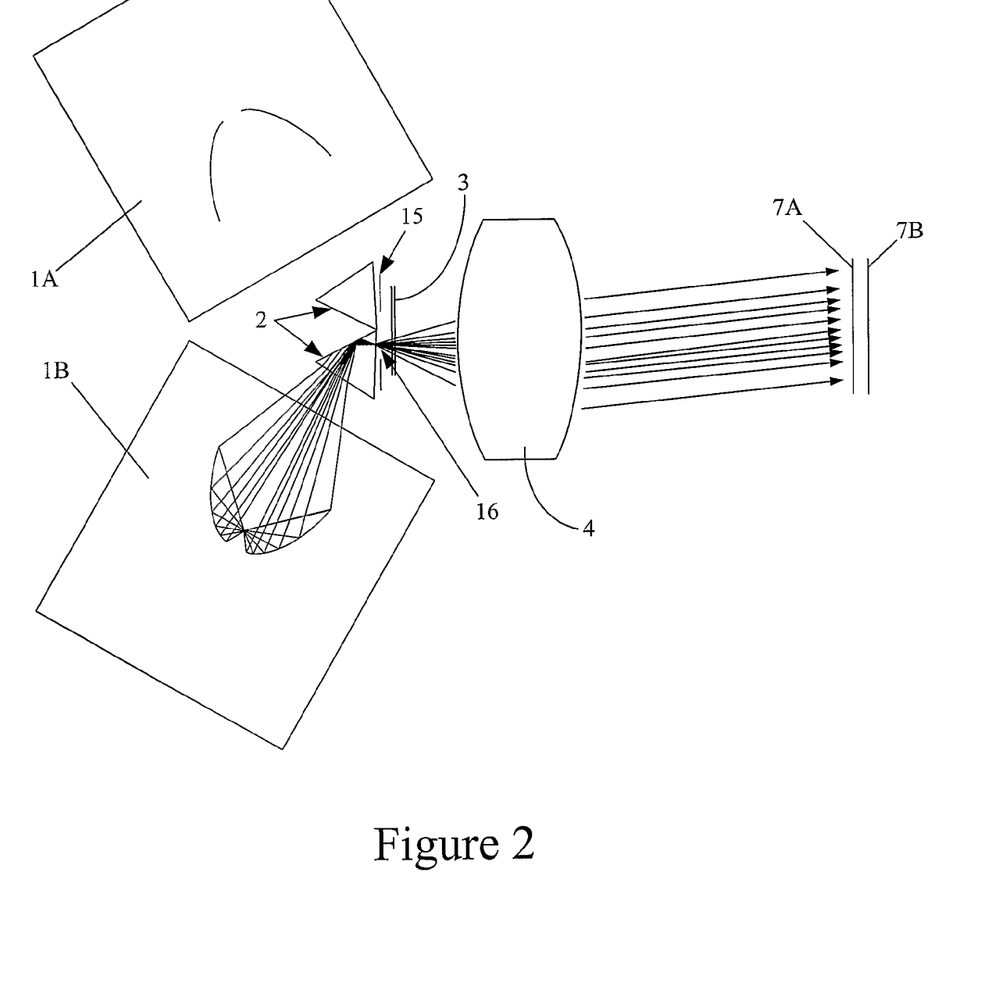
FIG. 2 shows the combination of lamps in more detail with one lamp in operation according to one embodiment of the present invention.

FIG. 2 shows the combination of lamps 1A, 1B in more detail with a few select rays from one of the two lamps 1B shown. (For illustrative purposes, the dowser is not shown in this figure and a point source is assumed for the arc of the lamp.) Note that the lamp focus 16 is offset from the optical axis of the collimating optics 4 that follows. The orientation of the prisms about this optical axis is dictated by the Lagrangian formed by the image gate 10 and projection lens 11 as depicted in FIG. 1. This Lagrangian at the image gate 10 may be used to determine the aperture 15 size at the output of the prisms into which light must travel to pass through the system and onto the screen. The aperture 15 is normally rectangular in shape due to a rectangular image gate coupled with a non-anamorphic projection lens. To minimize loss, the offset of the lamp focus 16 should coincide with the long dimension of the rectangular aperture 15. The aperture 15 depicted in FIG. 2 shows the extent of the larger of the two dimensions of the rectangular aperture 15. Light from each lamp 1A, 1B sees one half of the full aperture 15. The offset of the lamp focus 16 from optical axis is chosen such that the illuminance distribution is centered within the half of the aperture used by that lamp. As the lamp ages and the illuminance distribution at the lamp focus 16 increases in size, the light output will remain constant until the edge of the light is vignetted by the boundaries formed by the aperture 15 and the apex of the prism 2 nearest the lamp focus 16.

Figure 3:
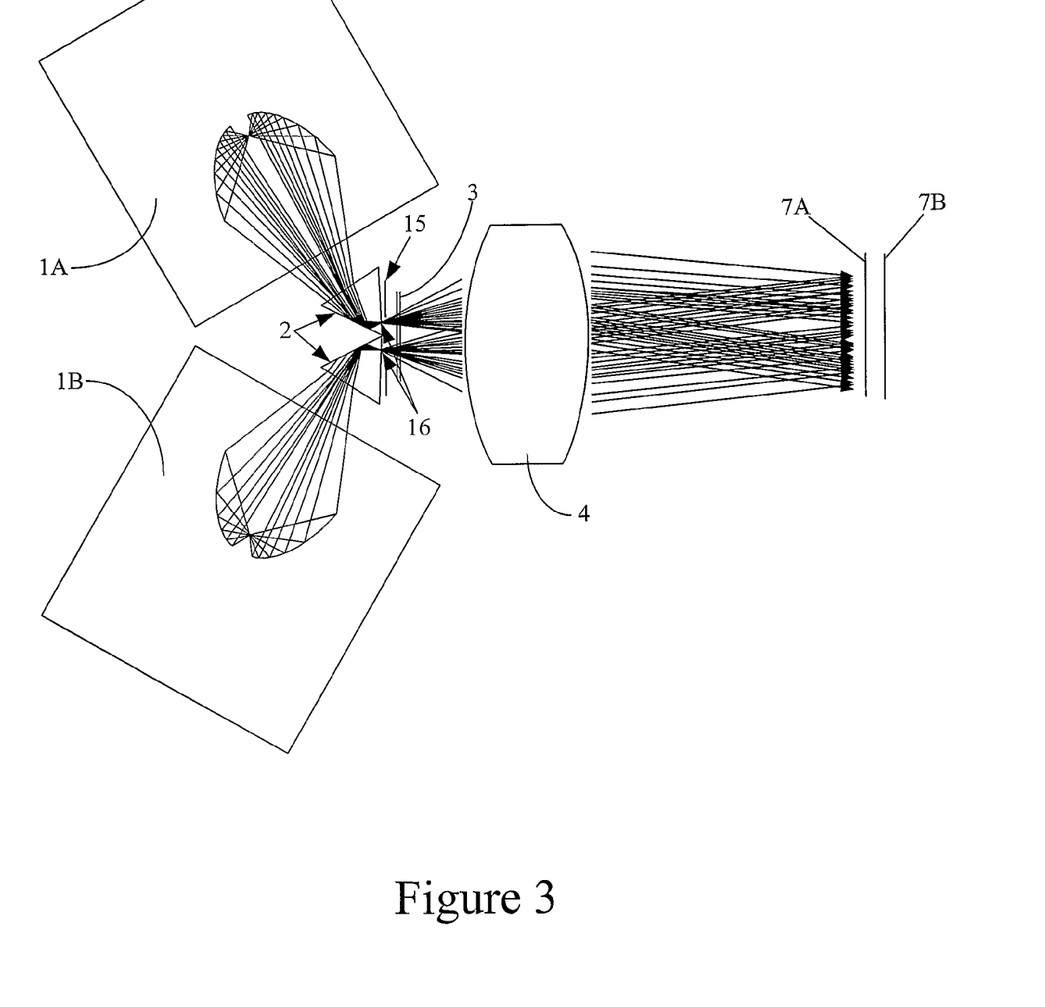
FIG. 3 shows the combination of lamps in more detail with two lamps in operation according to one embodiment of the present invention.

FIG. 3 shows the combination of lamps with rays from both lamps 1A, 1B turned on. (For illustrative purposes, the dowser is not shown in this figure and a point source is assumed for the arc of the lamp.) Note that the output light is collimated for each of the two lamps 1A, 1B but skewed at an angle relative to the optical axis due to the offset of the lamp foci from the optical axis. The prisms 2, in this case, are tilted slightly about an axis perpendicular to the plane of reflection in order to modify the characteristics of the reflected illumination beams. This tilt can aid in reducing the keystone distortion of the illumination at the image gate 10, caused by the offset of the images of the arc 16 and is designed to match the illumination light to the entrance pupil of the illumination system (located at lens array 7B) for improved efficiency. This matching is illustrated by the convergence of light from the two lamps into a single patch of light onto the lens array 7A.

FIGS. 2 and 3 show the collimating optics 4 as single lens. Those skilled in the art know that collimation can be performed by multiple lenses if necessary to reduce aberrations.

While FIG. 3 shows an illustrative embodiment for lamp combination that is compact, those skilled in the art would realize that there are alternatives. For example, if the lamp assembly was fabricated with parabolic reflectors, the collimated output of the lamps can be combined by tilting their output relative to the optical axis such that the light beams superimpose at the lens array. This method may not be as compact as that shown in the illustrative embodiment of FIGS. 2 and 3 and can suffer from an increase in etendue present at the lens array compared to that of the lamp due to the distance between the lamp and the lens array. Optics can be added into the system to eliminate this inefficiency, but this may further increase the size of the system.

Beam Integrator

Figure 4:
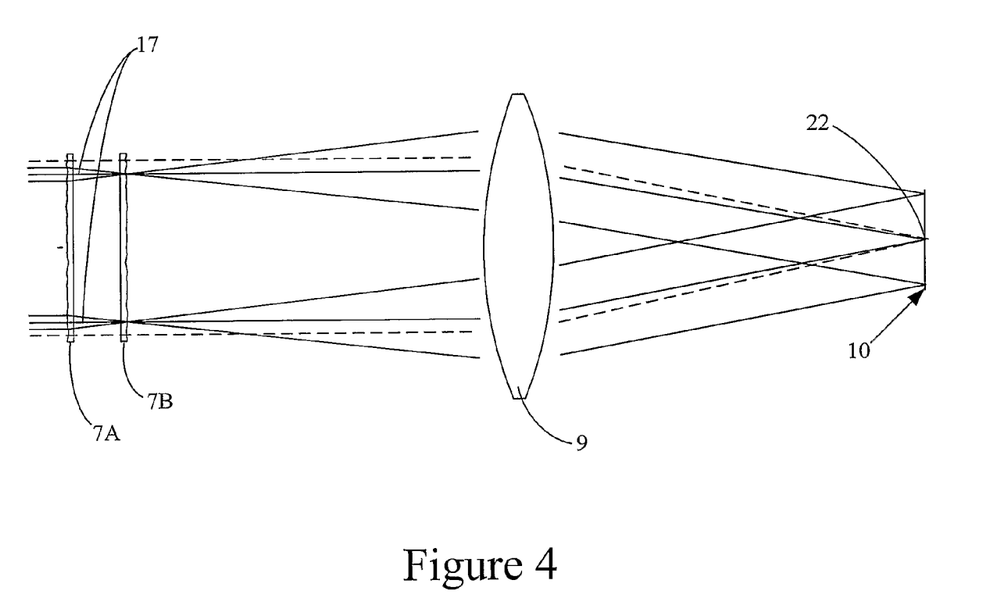
FIG. 4 shows a method according to one embodiment of the present invention by which the light distribution at the input to the lens array is transformed to a uniform patch of light at the image gate with minimal light loss.

FIG. 4 shows a method by which the light distribution at the input to the lens array 7A, 7B is transformed to a uniform patch of light at the image gate with minimal light loss. The two lens arrays 7A, 7B may be identical, and aligned so that each element of the first array 7A shares a common optical axis with its corresponding element on the second array 7B. The apertures of the array elements are chosen to match the geometrical shape of the image gate 10 to be illuminated. The lens array pair 7A, 7B and the relay optics 9 function to create a uniform illumination distribution on the image gate 10.

Sometimes referred to as a "fly's eye" beam homogenizer, these components may function as follows. The two lens arrays 7A and 7B are nominally separated by a distance equal to the focal length of the individual elements making up the arrays. Each lens element (or lenslet) of the first lens array 7A creates an image of the source(s) within the aperture and at the plane of the corresponding lens in the second array 7B.

Each element of the second lens array 7B then forms an image of the aperture of the corresponding element of the first lens array 7A. These sub-images are projected to infinity by the lenses of the second array 7B. The relay optics 9 serves to superimpose the sub-images onto the film gate 10 with a slight overfilling of the aperture to allow for optical and assembly tolerances. To illustrate the combination of images, FIG. 4 shows solid lines representing two chief rays and an axial ray 17 from two specific lenslets in the array. These are shown to superimpose upon one another at 22 at the image gate 10. The dimensions in FIG. 4 are not intended to indicate relative scale.

Light from each lenslet in lens array 7A illuminates the entire image gate 10. Referring back to FIG. 3, each lamp 1A, 1B is responsible for illuminating the entire image gate 10.

The etendue limit of the optical system is dictated by the area of the image gate 10 and the numerical aperture of the projection lens 11. Using the principle of etendue conservation, the focal length of the relay lens 9 is selected to balance the competing objectives of compactness of the system, constraining the size of the lens array 7A, 7B to accommodate fabrication limitations, and providing sufficient area to support a large array of lenses.

The fly's eye beam-integrator system operates by superimposing numerous sub-images at the image gate, resulting in an illumination distribution that is the (incoherent) sum of the illumination distributions across each individual aperture of the first lens array 7A. The uniformity is a function of the number of array elements and the individual distributions. As the number of array elements increases, the uniformity of the resulting superimposed sum of sub-images will improve. The individual lens size can be chosen as a balance between the degree of homogenization and light efficiency of the system. Smaller lenses can lead to a lower fill-factor (the ratio of the clear aperture of a lens to the size of the lens) and increased scattering thus lowering system efficiency. This is a result of finite sized transition regions between lenslets, a feature that is limited by fabrication technology.

There are a number of factors that limit the density of lenses in the lens array 7A and 7B. The magnification of the input lens array 7A to the image plane 10 is given by the ratio of focal length of the relay optics 9 to the focal length of the lens array. As stated previously, the focal length of the relay optics fixes the overall size of the array. As the lenses in the array get smaller, care must be made to ensure the resulting radius of curvature of the lenslets, due to the smaller focal length, remains within manufacturing tolerance limits of this molded optical element. Also, it can be appreciated that smaller lenslets will require better lateral and rotational precision in order to maintain the relative alignment between the two arrays thus increasing manufacturing cost.

The relay optics 9 shown in FIGS. 1 and 4 is drawn as a single element for illustrative purposes. It will be apparent to those skilled in the art that relay optics satisfying the requirements given above may consist of multiple lenses to reduce aberrations. It will also be apparent to those skilled in the art that the type of modulator used at the image gate will affect the design of the relay optics 9. For example, spatial light modulators including, but not limited to, MEMS, LCOS and transmissive liquid crystal panels, will require color separation and color recombination optics which in turn place back focal length and telecentric requirements on the design of the relay optics.

In one embodiment, the combined etendue of the light sources combined into one channel is less than the etendue defined by the image plane. This ensures that the second lens array remains under filled and insensitive to the exact mechanical placement of the light source and to the tolerances involved in creating the integrated light source and reflector assembly. Lamps may then be replaced without the need for alignment to achieve peak performance. A characteristic of DC arc lamps, CERMAX lamps included, is that the cathode burns back as the lamp ages. This increase in electrode separation leads to an increase in etendue. Provided the resultant etendue is less than the etendue of the optical system that follows, the light output remains constant as the lamp ages.

Shimmer and the Holographic Diffuser

Arc lamps are generally subject to a continuous spatial modulation of the arc location within the arc lamp envelope. This modulation is caused by gas turbulence within the envelope of the arc lamp. In addition, as the lamp ages, it is common for the electrodes to become worn and pitted leading to a fluctuation in the attachment point of the arc. The resulting light output from the arc is further modulated by the density dependent fluctuations of the gas within the envelope of the lamp. The modulation of the position of the arc, combined with density fluctuations in the gas, lead to a modulation of the angular intensity distribution from the reflector. This yields a primary lamp focus 16 that is modulated both in space and in angle.

Figure 5:
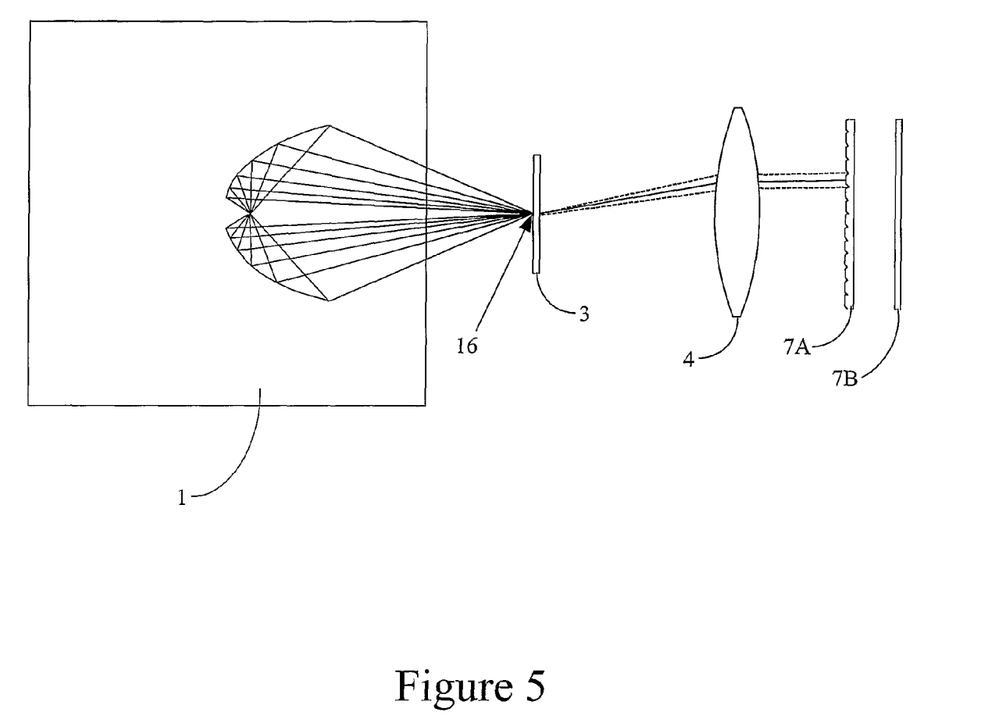
FIG. 5 illustrates how the angular and spatial modulations at the primary lamp focus propagate through to the first lens array according to one embodiment of the present invention.

FIG. 5 illustrates how the angular and spatial modulations at the primary lamp focus 16 propagate through to the first lens array 7A. The collimating lens 4 acts to convert the angular modulation at the primary focus 16 to a spatial modulation first lens array 7A. Likewise the spatial modulation at the focus 16 is converted to an angular modulation at the first lens array 7A.

If one is limited by the etendue of the light source, the first order effect of the angular modulation at the lens array 7A can be to modulate the over fill of light present at the second lens array 7B. This introduces a time dependent loss in the system resulting in flicker at the image gate. Standard closed loop feedback mechanisms can be used to eliminate this global modulation. For example, a detector monitoring the light output from the projector can signal to the lamp's current control to reduce the global modulation.

In one embodiment, where the combined etendue of the light sources is less than the etendue defined by the image gate and the projection lens, the angular modulation at the lens array does not affect the stability of the light at the image gate 10 due to the fact that the second lens array 7B is under filled.

The spatial modulation at the first lens array 7A, caused by the angular modulation at the lamp focus becomes a local spatial modulation or equivalently shimmer at the image gate 10. This is true regardless of whether the lamp or the optical system limits the etendue. Unlike flicker, a standard closed loop feedback system will not reduce the shimmer. The magnitude of the modulation at the image gate 10 is generally less than that at any single lens within array 7A because the modulation is normally random from lens to lens and the light from multiple lenses is superimposed at the film plane. The resulting temporal noise at the film plane is roughly reduced by the square root of the number of lenses illuminated. As stated earlier, manufacturability of the lens array and a negative impact on light efficiency place a limit on the number of lenses that can be used in the array 7A and 7B.

There is a desire to reduce these spatially dependent temporal fluctuations further than what can be done by increasing the number of lenses. Reducing flicker to levels below visual detection threshold when the lamp is new is a primary requirement. There is a secondary requirement to reduce the flicker levels so that as the lamp ages, greater instabilities in the arc do not translate to perceived flicker. This secondary requirement may become important in a system such as this one. Whereas the normal lamp failure mechanism is due to the increased arc gap and the increased etendue and light loss that it incurs, the Cermax's small etendue offers far more change in arc gap size before its etendue degrades the system's performance. In one embodiment, the lifetime of the Cermax lamps is also extended by operating at less than their full output power. As a result, it is expected that in projection systems designed in accordance with the present invention, lamp life may become limited by stability, not increase in etendue. Improving the shimmer reduction can increase lamp life yet further again, leading to savings in lamp cost and maintenance requirements.

It is the function of the diffuser 3 to further reduce the spatial fluctuations and extend the life of the arc lamps without placing more stringent demands on the fly's eye integrator. The schematic depicted in FIG. 5 discloses the operating principle of the diffuser 3 when used in concert with the fly's eye integrator for shimmer reduction. The integrated lamp assembly 1 focuses its output to the nominal focal plane 16, where an image of the arc is formed. The converging cone of rays defines the nominal envelope containing the lamp's output.

The angular modulations at the reflector's focal plane 16 are transformed by the collimating lens 4 to spatial fluctuations at the first lens array 7A. Because of the limited angular excursion of the perturbations of the illumination at the focal plane 16, there is a limited spatial extent of the induced irradiance fluctuations at the first lens array 7A. This is indicated in FIG. 5 by the dashed lines showing envelope of the maximum deviation cone propagating from the focal plane to the first lens array 7A. The area defined by the projection of the cone on the lens array surface defines the region over which the flicker may extend.

By inserting an engineered diffuser 3 at or near the focal plane 16 of the lamp 1, and designing the diffuser 3 so that it diffuses the light over a range of angles dictated by the angular perturbation cone from the lamp 1, the perceived shimmer can be eliminated. Each and every elemental illumination contribution from the focal point, whether nominal or perturbed, is diffused, or "blurred" to illuminate a larger region at the lens array. This is equivalent to convolving the instantaneous irradiance distribution over the entrance of the lens array pair 7A, 7B by the response of the diffuser 3. The irradiance distribution at any point on the first lens array 7A is then seen to be averaged with the irradiance of the neighboring points on the surface, with the averaging region having a size and extent defined by the diffusion angle of the diffuser 3. Table 1 below shows the reduction of shimmer as a function of the magnitude of angular perturbation relative to the magnitude of diffusion. Results are shown for the simple case of a diffuser with a Gaussian scattering profile with full width half maximum (FHWM) of W. The effectiveness of the diffuser 3 to remove shimmer improves as the angular perturbation decreases. In practice, it has been found that with 2.4 kW CERMAX lamps as the light source, a Gaussian diffuser with FHWM equal to 1 degree removed 80% of the existing shimmer, which in this case left fluctuations well below the visual detection threshold. Table 1 indicates that the primary source of lamp perturbations were less than 1.5 degrees.

TABLE 1

| Lamp Perturbation Extent (× W) (In degrees) | Shimmer Removed (%) |
|---|---|
| .5 | 99.5 |
| .75 | 99.1 |
| 1 | 97.5 |
| 1.25 | 90.7 |
| 1.5 | 81.0 |
| 2.0 | 60.8 |
| 3.0 | 34.2 |
| 4.0 | 21.0 |
| 5 | 13.9 |

As the lamp ages and instabilities increase, the amount of diffusion required to eliminate perceived flicker becomes greater. The etendue of the light source as viewed from the output from the diffuser may be calculated by including the effects of lamp fluctuations and the amount of angular scattering introduced by the diffuser. Provided the combined etendue from all these light sources directing their output into the single channel remains less than the etendue defined by the projection lens and image gate, the system may be designed to allow the addition of the diffuser without any loss of light efficiency.

In one embodiment, a holographic diffuser is used because backscattering is negligible and it represents a compact cost effective solution. The diffusing power of a holographic diffuser can also be made asymmetric to better smear the angular perturbations from the lamp which may themselves not be symmetric. This will optimize the illumination throughput while reducing flicker to well below the limit of human perception. Those skilled in the art will realize that other means of diffusing light may be employed, including, but not limited to, standard diffusers, lens arrays, diffractive gratings, and scattering introduced by the movement of an element at a rate such that the scatter is not perceived by the human visual system.

In one embodiment, the light diffusion is engineered to be anisotropic. One reason to make the diffuser anisotropic is to overcome variations in the lamp output that are more pronounced for some angles compared to others. Another reason to engineer an anisotropic diffuser is to optimize overall system performance when anisotropic behavior within other parts of the system exists. To illustrate this point, consider the case of electronic projectors that use spatial light modulators to create an image on the screen. The modulators themselves generally have a performance that is dependent upon the angle of light incident upon them. For example, the off axis illumination of a DMD modulator yields an asymmetry in its scattering and diffraction characteristics. This anisotropic scattering and diffraction from the modulator, relative to the optical axis of the system, leads to a degradation in projection system contrast and efficiency. Another example is that of projectors that employ LCD and LCOS modulators. These modulators rely on polarized light to achieve high contrast. Here contrast can be compromised by the angle dependent leakage of light as skew rays propagate through the system. In either of these cases, designing the characteristics of a diffuser with the knowledge of anisotropies that exist elsewhere in the system allows one to optimize the projection system performance. Those skilled in the art will realize that there are other examples of anisotropies existent in projection systems and to which this embodiment applies.

The position in one embodiment of the diffuser 3 is near the focus 16 of the lamps. However, other locations that are sufficiently distant from lens array 7A to minimize loss from scattering may be used. In one embodiment, the diffuser 3 is placed near the pupil of the illumination system (at lens array 7B) or any conjugate plane to that pupil. In a one embodiment, the diffuser 3 is placed near the output of the combining prisms 2 where the lamp light is focused. Other possible conjugate planes to lens array 7B include those that are formed through the addition of relays in the system.

A light pipe (also commonly known as an integrating bar, a light bar, or a kaleidoscope), with appropriate optics, can be used in place of the fly's eye integrator to achieve similar advantages when applied to the present invention. While the system size and cost may be greater for a light pipe integrator, the multi-lamp method for light balancing and improving operating efficiencies is just as applicable with this technology. As shown below, the mixing properties of the light pipe will also benefit from the addition of a diffuser in front of the light pipe's entrance to eliminate shimmer.

Figure 6:
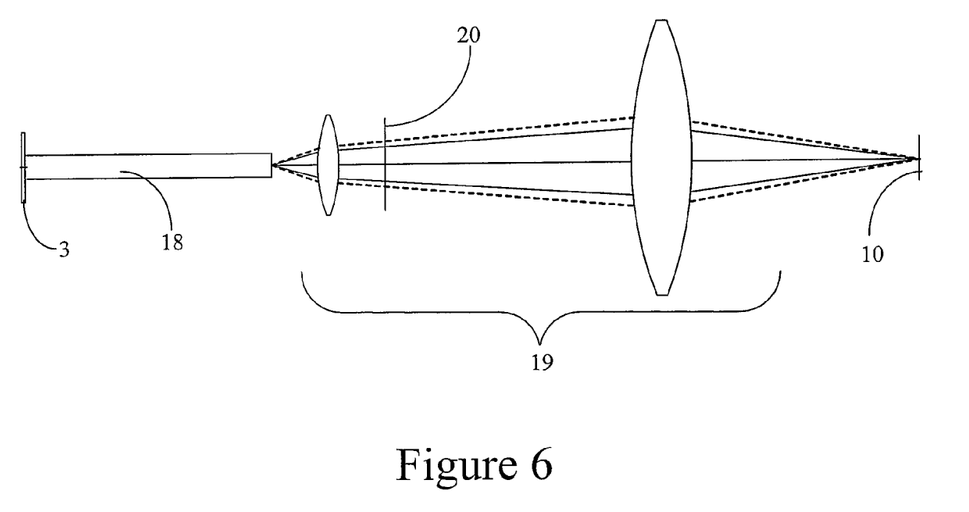
FIG. 6 illustrates a diffuser used with a light pipe integrator to reduce shimmer at the image gate according to one embodiment of the present invention.
Figure 7:
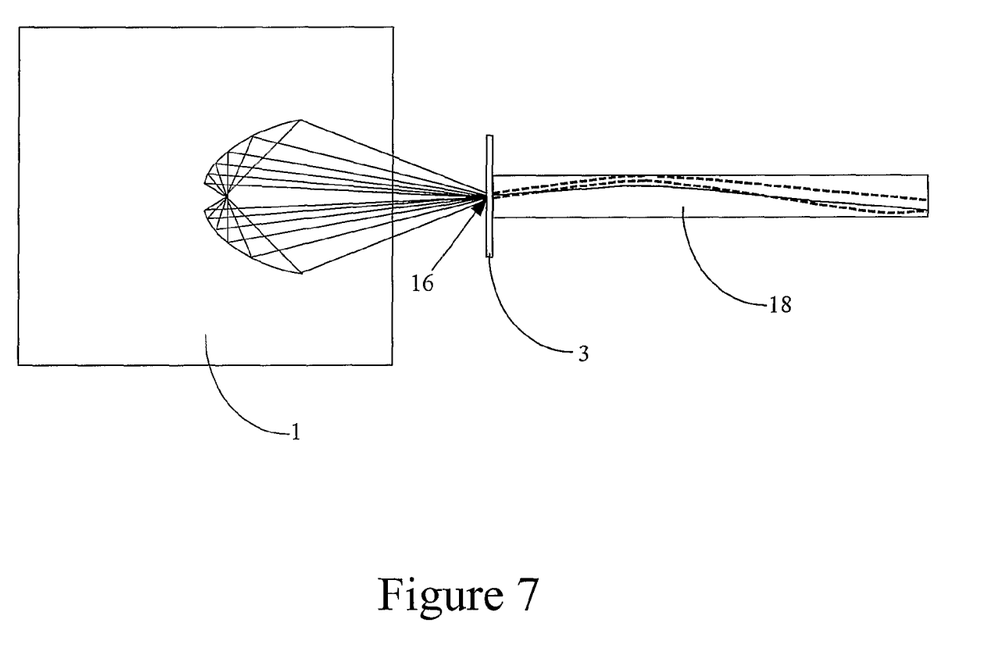
FIG. 7 illustrates a diffuser used with a light pipe integrator to reduce shimmer at the image gate according to one embodiment of the present invention.

FIGS. 6 and 7 illustrate how the diffuser may be used with a light pipe integrator to reduce shimmer at the image gate 10 and therefore at the screen. The diffuser 3 is positioned in front of a light pipe, such as an integrating bar 18. FIG. 6 shows how the homogenized illuminance distribution, including any temporal modulations, located at the output of the integrating bar 18 is imaged to the image gate 10 with appropriate magnification to allow a slight over fill of the gate. The relay 19 that images the light to the image gate 10 also serves to couple the light to the pupil of a projection lens that follows. The pupil of the relay 19 is shown as 20 in FIG. 6.

FIG. 7 illustrates how light propagates from the lamp 1 to the output of the light pipe, such as an integrator bar 18, according to one embodiment of the present invention. In this illustration, the light pipe is illuminated by a single lamp 1. The light travels to the output of the light pipe by total internal reflection for a solid light pipe, or reflection for a hollow light pipe. The dashed lines in FIG. 7 represent the envelope of the maximum deviation cone caused by angular fluctuations from the lamp 1. The degree of homogenization increases as the light pipe length is increased relative to its cross-section. This is due to an increased number of reflections along the length of the light pipe. As the light pipe is lengthened, the illumination system becomes less compact, manufacturing costs increase and the efficiency of the system drops due to bulk and surface scattering through the light pipe. The designer is therefore penalized by increasing the homogenizing performance of the light pipe to address the added demands of shimmer reduction.

As with the fly's eye integrator, an alternative method is desired to eliminate fluctuations that result in perceived shimmer when the lamp is new and as it ages. The addition of an engineered diffuser working in concert with the light pipe serves to reduce this shimmer below the human visual system detection threshold. FIG. 7 shows one embodiment with the diffuser 3 placed near or at the input surface of the integrating bar 18. The spatially dependent flicker is eliminated when the angular scattering is equal to or exceeds the angular modulations from the lamp.

If the system is not limited by the etendue of the light output from the diffuser, the system may be designed to ensure no light is lost through the introduction of the diffuser. The dashed lines in FIG. 6 show the increase in numerical aperture due to diffusion while the solid lines show the chief and marginal rays corresponding to the output of the lamp without a diffuser present. Should the image gate and or projection lens not be capable of accepting light of the increased numerical aperture introduced by the diffuser, vignetting may cause light loss through the system and can also result in contrast degradation. There are a variety of ways to redesign the system to eliminate this problem. For example, a change in the lamp reflector could be made to illuminate the input of the light pipe with light of slightly lower numerical aperture. This would lead directly to a reduction in the cone angle output from the light pipe. The spot size at the entrance to the light pipe would increase but not result in any loss because the system is not limited by the etendue of the lamp. Another way to reduce the cone angle output from the light pipe would be to introduce a slight taper in the light pipe. Here, the output cross-section would remain the same and the input cross section of the light pipe would be decreased once again without incurring any efficiency penalties.

Shimmer Detection

An effective indicator of illumination system performance can be constructed within the illumination system to ensure that performance is maintained to the end of the life of the lamp. Such a system can automatically signal a warning to the operator that the lamps require replacement before the audiences can perceive reduced performance. In addition, a controller can be used to manage lamps based on their performance. This includes the possibility of switching to another lamp within a presentation or judiciously choosing which lamp is to run at lower power to maximize presentation quality. By using two or more sensors within the illumination system, the spatial/temporal modulations can be monitored. Signal processing methods, such as differencing the signal from these detectors, would give a direct measure of the stability of the source. The active area of the sensors and their spacing would be designed to optimize sensitivity to fluctuations, allowing early warning of lamp problems before they compromise the theatre experience.

As shown in FIG. 1, in the preferred embodiment, the sensors, such as detectors 14, are placed behind the upper cold mirror 8 to detect the leakage of visible light or sample the infrared light that is present in this location. In one embodiment, the detectors 14 are positioned behind a lens so that modulations detected are directly proportional to modulations seen at the input lens array 7A. The lens in front of the detector 14 acts as a relay so that the detectors 14 lie in a plane conjugate to lens array 7A and the image gate 10. Thus each detector 14 samples light that corresponds to a distinct location at the image gate 10. There are advantages to limiting the aperture of the detector's relay lens so that the detector monitors light from a subset of lenslets in lens array 7. First, limiting the aperture of the detector's relay lens reduces the detection system size and cost. Second, the lateral position of the detector assembly behind the upper cold mirror 8 can be judiciously chosen to observe shimmer from a subset of lenslets.

The selection of a subset of lenslets maps directly back to a portion of the angular intensity distribution output from the lamp and thus allows one to look at the shimmer contribution from different positions on the reflector of the lamp. This ability to select a region on the reflector is particularly advantageous when combined with the knowledge of convective patterns present within the lamp. Multiple detector assemblies can be incorporated to yield shimmer contributions from a variety of positions on the lamp. To reduce the cost of such an implementation, a lens array can be used in front of the detectors rather than using discrete lenses. Analysis of the signal from these detectors can allow the extraction of data well correlated with the shimmer at the film plane. Those skilled in the art will realize that this sampling of the light is not limited to this location.

Automated Retraction and Insertion

A stereoscopic projection system encodes the light so that left and right eye images received by a viewer enter the proper eye with minimal light entering the wrong eye. Light may be encoded by polarization, time multiplexing, color or direction plus any combination thereof. In one embodiment, an automated controller of the projection system inserts the encoder in the correct orientation automatically, eliminating an error prone and tedious task for the projectionist. If left to the projectionist, the repetitive nature of the task and limited time between presentations can lead to incorrect placement of encoders. This includes but is not limited to mixing up right eye and left eye encoders and inserting encoders in the wrong orientation. These gross errors lead to unwatchable 3D presentations. If the separation between left and right eye images is based on linearly polarized light, there exists a strict requirement for the orientation of the linear polarizers to minimize ghosting. It can be difficult to maintain this requirement when polarizers are manually inserted leading to sub-optimum system performance. For a 2D presentation mode, the encoder or encoders are automatically retracted. This overcomes the error of accidentally leaving the encoder or encoders in place leading to a degradation in 2D presentations. For example, if the encoder is a polarizer and it is left in, the 2D presentations become unacceptably dim. If the encoder is a color filter then the 2D presentation is both dim and has unacceptable color. As seen in FIG. 1, a polarizer 12 is used to encode the light and is located in front of the projection lens 11. Other locations within the projector are possible. The encoder or encoders may be, for example, a linear polarizer, a circular polarizer, an elliptical polarizer, a shutter, a color filter, or an active polarizer, such as a Z-screen. A variety of mechanical systems to retract and insert the encoder or encoders into the optical path may be used including systems that achieve the requirements through a means of translation or rotation.

When the projection system is used for 3D presentations, light that is lost compared to output levels for 2D presentations may be partially recovered by automatic removal of elements in the projection system. In one embodiment, an element or elements that are normally needed to boost the quality of 2D presentations are automatically removed to improve light levels. Such elements include, for example, masks for boosting the contrast and color filters for improving the color quality of 2D presentations. To achieve optimum overall performance such elements are removed in an automated fashion for 3D presentations and inserted back in the system for 2D presentations. Masks are normally employed at or near the pupil of a relay in the illumination chain. As well, a mask may be employed at or near the pupil of the projection lens. This is to reduce previously disclosed anisotropic unwanted light in specific directions that leaks through the system due to, for example, scattering, diffraction, or polarization effects. A color filter may be a notch filter or filters to increase color separation between color components.

Cold Mirror/Dowser

In one embodiment, a substantial component of the infrared (IR) radiation from the lamp illumination is removed by virtue of a dichroic coating on the cold mirror/dowser 5 shown in FIG. 1. The IR radiation is transmitted through to the beam stop 13, while the visible component of the lamps' radiation spectrum is reflected through to the lens arrays 7A, 7B. The cold mirror/dowser 5 protects the film and other downstream components from being exposed to the excessive heat that would be generated by the IR radiation were it not removed from the optical path.

By mounting the cold mirror/dowser 5 on a hinge or other rotating or translating mechanism, the cold mirror/dowser 5 can be moved completely out of the optical path. In this position, all of the illumination light is directed to the beam stop, and no light is permitted to escape from the projector's lens at all. Thus the projection system can be darkened without extinguishing the lamp(s). The hybrid cold mirror/dowser 5 eliminates a mechanical component typically found in projection systems, thereby reducing part count, simplifying the design, and reducing size. It also allows the same single heat sink, such as beam trap 13, that is used for the IR light to be used for the visible light thus reducing components again and simplifying thermal management allowing more compact system.

Cooling

Cooling the illumination is critical for stable operation and reliable performance. The effectiveness of the cold mirrors in removing the IR from the illumination significantly reduces the heat load on the second stage of the optical system, i.e. those parts of the system downstream of the first cold mirror 5 shown in FIG. 1. The second stage of the optical system can be sealed and therefore protected from the surrounding environment. This may eliminate the requirement for cleaning and maintaining this stage of the optical system.

The first stage can also be maintained within a sealed enclosure with a filtered forced air-cooling system providing the required ventilation. The filtered air can be pulled from behind the beam stops through to the lamps. By filtering the cooling air prior to pulling it into the enclosed environment of the illumination system, the cleanliness of the optics can be assured. This reduces maintenance, increases reliability, and once again reduces operating costs.

General

While the above description contains many specifics, these specifics should not be construed as limitations on the scope of the invention, but merely as exemplifications of the disclosed embodiments. Those skilled in the art will envision any other possible variations that are within the scope of the invention. For example, the present invention is equally applicable to large format film projections systems, 35 mm film projection systems, and electronic projection systems.

That which is claimed:

1. A projection system switchable between a two-dimensional presentation mode and a three-dimensional presentation mode, comprising:
   a first light source capable of projecting light for a first eye through a first channel having a first projection path;
   a second light source capable of projecting light for a second eye through a second channel having a second projection path;
   two-dimensional presentation quality boosting elements configured for being automatically moved out of at least one of the first projection path or the second projection path when the projection system is switched from the two-dimensional presentation mode to the three-dimensional presentation mode; and an encoder device configured for encoding image information from an image source and for being automatically moved out of at least one of the first projection path or the second projection path when the projection system is switched from the three-dimensional presentation mode to the two-dimensional presentation mode.

2. The projection system of claim 1, further comprising:
a third light source capable of providing light for the first channel; and
a fourth light source capable of providing light for the second channel;
wherein when the projection system is in the three-dimensional presentation mode the second and fourth light sources are on, and wherein when the projection system is in the two-dimensional presentation mode the second and fourth light sources are off.

3. The projection system of claim 1, wherein when the projection system is in the two-dimensional presentation mode the second light source is off.

4. The projection system of claim 1, wherein when the projection system is in the two-dimensional presentation mode the first light source is operated at a reduced power.

5. The projection system of claim 1, wherein when the projection system is in the three-dimensional presentation mode the first light source is off.

6. The projection system of claim 1, wherein when the projection system is in the three-dimensional presentation mode the second light source is operated at a reduced power.

7. The projection system of claim 1, further comprising a third light source capable of providing light for the first channel.

8. The projection system of claim 1, wherein the projection system is a film-based projection system.

9. The projection system of claim 1, wherein the projection system is an electronic projection system.

10. The projection system of claim 1, further comprising:
a diffuser capable of reducing shimmer to levels below a human detection threshold.

11. The projection system of claim 1, wherein the diffuser is located near a pupil of an illumination system of the projection system.

12. The projection system of claim 1, further comprising:
a projection lens; and
integrating optics located between the projection lens and the first and second light sources.

13. The projection system of claim 12, wherein the integrating optics comprise a fly's eye integrator.

14. The projection system of claim 12, wherein the integrating optics comprise a light pipe.

15. The projection system of claim 12, wherein the projection system is capable of:
combining prisms for combining light from the first light source and the second light source.

16. The projection system of claim 12, further comprising:
a cold mirror, wherein the cold mirror is capable of moving to send light to a beam dump.

17. The projection system of claim 16, wherein the cold mirror is placed within the system such that it sends a substantial portion of IR light from the light sources to the beam dump.

18. The projection system of claim 1, further comprising an internal detector capable of monitoring flicker and shimmer.

19. The projection system of claim 1, wherein the encoder device comprises:
a first encoder device associated with the first channel; and
a second encoder device associated with the second channel,
wherein the first encoder device is capable of automatically moving into the first projection path in the three-dimensional presentation mode and automatically moving out of the first projection path in the two-dimensional presentation mode, and wherein the second encoder device is capable of automatically moving into the second projection path in the three-dimensional presentation mode and automatically moving out of the second projection path in the two-dimensional presentation mode.

20. The projection system of claim 1, wherein the encoder device is capable of automatically moving into the first projection path in the three- dimensional presentation mode and automatically moving out of the first projection path in the two-dimensional presentation mode.

21. The projection system of claim 1, wherein the presentation quality boosting elements comprises at least one of:
a mask; or
a color filter.

22. The projection system of claim 1, wherein the projection system is switchable from the two-dimensional presentation mode to the three-dimensional presentation mode during a single presentation.

23. The projection system of claim 1, wherein the projection system is adapted to project light to a screen configured to display the light in the three-dimensional presentation mode and the light in the two-dimensional presentation mode.

24. A projection system switchable between a two-dimensional presentation mode and a three-dimensional presentation mode, comprising:
a first light source adapted for projecting light for a first eye through a first channel having a first projection path;
a second light source adapted for projecting light for a second eye through a second channel having a second projection path;
two-dimensional presentation quality boosting elements movable into at least one of the first projection path or second projection path when the projection system is switched from the three-dimensional presentation mode to the two-dimensional presentation mode, wherein the projection system is adapted to project light to a screen configured to display the light in the three-dimensional presentation mode and the light in the two-dimensional presentation model; and
an encoder device configured for encoding image information from an image source and for being automatically retracted from at least one of the first projection path or the second projection path when the projection system is switched from the three-dimensional presentation mode to the two-dimensional presentation mode.

25. The projection system of claim 24, further comprising:
a third light source adapted for providing light for the first channel; and
a fourth light source adapted for providing light for the second channel,
wherein the second and fourth light sources are configured to be on when the projection system is in the three-dimensional presentation mode,
wherein the second and fourth light sources are configured to be off when the projection system is in the two-dimensional presentation mode.

26. The projection system of claim 24, wherein the second light source is configured to be off when the projection system is in the two-dimensional presentation mode.

27. The projection system of claim 24, wherein the first light source is adapted to operate at reduced power when the projection system is in the two-dimensional presentation mode.

28. The projection system of claim 24, wherein the first light source is configured to be off when the projection system is in the three-dimensional presentation mode.

29. The projection system of claim 24, wherein the second light source is configured to operate at a reduced power when the projection system is in the three-dimensional presentation mode.

30. The projection system of claim 24, wherein the projection system is a film-based projection system.

31. The projection system of claim 24, wherein the projection system is an electronic projection system.

32. The projection system of claim 24, further comprising:
   a projection lens; and
   integrating optics located between the projection lens and the first and second light sources.

33. The projection system of claim 32, wherein the integrating optics comprise a fly's eye integrator.

34. The projection system of claim 32, wherein the integrating optics comprise a light pipe.

35. The projection system of claim 24, wherein the encoder device comprises:
   a first encoder device associated with the first channel; and
   a second encoder device associated with the second channel,
   wherein the first encoder device is capable of automatically moving into the first projection path in the three-dimensional presentation mode and automatically moving out of the first projection path in the two-dimensional presentation mode, and wherein the second encoder device is capable of automatically moving into the second projection path in the three-dimensional presentation mode and automatically moving out of the second projection path in the two-dimensional presentation mode.

36. The projection system of claim 24, wherein the encoder device is capable of automatically moving into the first projection path in the three-dimensional presentation mode and automatically moving out of the first projection path in the two-dimensional presentation mode.

37. The projection system of claim 24, wherein the presentation quality boosting elements comprises at least one of:
   a mask; or
   a color filter.

38. The projection system of claim 24, wherein the projection system is switchable from the two-dimensional presentation mode to the three-dimensional presentation mode during a single presentation.

39. A system comprising:
   a projection system switchable between a two-dimensional presentation mode and a three-dimensional presentation mode, comprising:
      a first light source adapted for projecting light for a first eye through a first channel having a first projection path;
      a second light source adapted for projecting light for a second eye through a second channel having a second projection path;
      two-dimensional presentation quality boosting elements movable into at least one of the first projection path or second projection path when the projection system is switched from the three-dimensional presentation mode to the two-dimensional presentation mode; and
      an encoder device configured for encoding image information from an image source and for being automatically moved out of at least one of the first projection path or the second projection path when the projection system is switched from the three-dimensional presentation mode to the two-dimensional presentation mode; and
   a screen configured to display light from the projection system in the three-dimensional presentation mode and in the two-dimensional presentation mode.

40. The system of claim 39, wherein the presentation quality boosting elements are adapted to be automatically removed from at least one of the first projection path or second projection path when the projection system is switched from the two-dimensional presentation mode to the three-dimensional presentation mode.

41. The projection system of claim 1, wherein the presentation quality boosting elements are configured for being removed from at least one of the first projection path or the second projection path for compensating light level reduced by the encoder device that is present when the projection system is in the three-dimensional presentation mode.

42. The projection system of claim 24, wherein the presentation quality boosting elements are configured for being removed from at least one of the first projection path or the second projection path for compensating light level reduced by the encoder device that is present when the projection system is in the three-dimensional presentation mode.

43. The system of claim 39, wherein the presentation quality boosting elements are configured for being removed from at least one of the first projection path or the second projection path for compensating light level reduced by the encoder device that is present when the projection system is in the three-dimensional presentation mode.

* * * * *